US011843947B2

(12) United States Patent
Cho et al.

(10) Patent No.: US 11,843,947 B2
(45) Date of Patent: Dec. 12, 2023

(54) ELECTRONIC DEVICE AND AUTHENTICATION METHOD IN ELECTRONIC DEVICE

(71) Applicant: Samsung Electronics Co., Ltd., Gyeonggi-do (KR)

(72) Inventors: Donghyun Cho, Gyeonggi-do (KR); Jinwoo Jang, Gyeonggi-do (KR); Junwoo Park, Gyeonggi-do (KR); Youngsok Song, Gyeonggi-do (KR); Rakyoung Yoon, Gyeonggi-do (KR)

(73) Assignee: Samsung Electronics Co., Ltd

( * ) Notice: Subject to any disclaimer, the term of this patent is extended or adjusted under 35 U.S.C. 154(b) by 211 days.

(21) Appl. No.: 17/432,404

(22) PCT Filed: Feb. 12, 2020

(86) PCT No.: PCT/KR2020/001955
§ 371 (c)(1),
(2) Date: Aug. 19, 2021

(87) PCT Pub. No.: WO2020/171466
PCT Pub. Date: Aug. 27, 2020

(65) Prior Publication Data
US 2023/0147815 A1    May 11, 2023

(30) Foreign Application Priority Data
Feb. 19, 2019 (KR) .................. 10-2019-0019207

(51) Int. Cl.
*H04W 12/069* (2021.01)
*H04W 12/71* (2021.01)
*H04W 12/033* (2021.01)

(52) U.S. Cl.
CPC ....... *H04W 12/069* (2021.01); *H04W 12/033* (2021.01); *H04W 12/71* (2021.01)

(58) Field of Classification Search
CPC .. H04W 12/033; H04W 12/069; H04W 12/71
See application file for complete search history.

(56) References Cited

U.S. PATENT DOCUMENTS

2007/0118886 A1* 5/2007 Martin ................ H04L 63/0435
726/5
2008/0107269 A1  5/2008 Gehrmann et al.
(Continued)

FOREIGN PATENT DOCUMENTS

KR  10-2006-0001440     1/2006
KR  10-2008-0088012    10/2008
(Continued)

OTHER PUBLICATIONS

European Search Report dated Feb. 18, 2022 issued in counterpart application No. 20759248.6-1218, 9 pages.
(Continued)

*Primary Examiner* — William S Powers
(74) *Attorney, Agent, or Firm* — The Farrell Law Firm, P.C.

(57) ABSTRACT

An electronic device and an authentication method in the electronic device are provided. The electronic device includes a communication circuit; and at least one processor operatively connected to the communication circuit. The at least one processor may be configured to confirm the occurrence of an authentication event for communication-related security data; in response to the occurrence of the authentication event, confirm at least one piece of communication-related security data stored in a designated area of the electronic device; transmit a certificate request message including the at least one confirmed piece of communication-related security data, to an authentication server by means of the communication circuit; receive a certificate, generated based on at least one communication-related security data included in the transmitted certificate request
(Continued)

message from the authentication server through the communication circuit; and authenticate use authority of the communication-related security data, based on the received certificate.

20 Claims, 12 Drawing Sheets

(56) References Cited

U.S. PATENT DOCUMENTS

| | | |
|---|---|---|
| 2010/0325427 A1 | 12/2010 | Ekberg et al. |
| 2011/0271330 A1 | 11/2011 | Zhang |
| 2013/0090091 A1 | 4/2013 | Weng |
| 2014/0329502 A1* | 11/2014 | Lee ................ H04W 12/04 455/411 |
| 2015/0187151 A1* | 7/2015 | Lagerstedt ............ G07C 9/27 340/5.61 |
| 2016/0080938 A1 | 3/2016 | Kim et al. |
| 2016/0149903 A1* | 5/2016 | Suh ............. H04L 63/0428 713/156 |
| 2016/0277404 A1* | 9/2016 | Chen ................. H04W 40/24 |
| 2017/0111398 A1* | 4/2017 | Shiraishi ........... H04L 63/083 |
| 2020/0104500 A1* | 4/2020 | Martino ................ G06F 8/65 |

FOREIGN PATENT DOCUMENTS

| | | |
|---|---|---|
| KR | 10-2009-0059346 | 6/2009 |
| KR | 10-2010-0114254 | 10/2010 |
| KR | 10-2013-0026958 | 3/2013 |
| KR | 10-2016-0031281 | 3/2016 |
| KR | 10-2019-0108888 | 9/2019 |

OTHER PUBLICATIONS

PCT/ISA/210 Search Report issued on PCT/KR2020/001955, dated May 21, 2020, pp. 5.
PCT/ISA/237 Written Opinion issued on PCT/KR2020/009155, dated May 21, 2020, pp. 5.
Korean Office Action dated Oct. 25, 2023 issued in counterpart application No. 10-2019-0019207, 9 pages.

* cited by examiner

ELECTRONIC DEVICE AND AUTHENTICATION METHOD IN ELECTRONIC DEVICE

CROSS-REFERENCE TO RELATED APPLICATION(S)

This application is a National Phase Entry of PCT International Application No. PCT/KR2020/001955, which was filed on Feb. 12, 2020 and claims priority to Korean Patent Application No. 10-2019-0019207 filed on Feb. 19, 2019 in the Korean Intellectual Property Office, the disclosures of which are incorporated herein by reference in their entireties.

TECHNICAL FIELD

Various embodiments relate generally to an electronic device and a method of authentication in an electronic device.

BACKGROUND ART

A device identification number (for example, an international mobile equipment identity (IMEI) or a mobile equipment identifier (MEID)) may be assigned to an electronic device (for example, a portable communication device).

For example, the IMEI is a unique number of a portable communication device corresponding to a 15-digit number of a combination of a device manufacturer, a model name, and a serial number. The IMEI may be used for various purposes. For example, when a base station initially attempts communication with an electronic device, the base station may identify whether the electronic device is its own device through the IMEI and block the communication if the electronic device is not its own device. The IMEI may be used for the purpose of investigation to trace a caller or check call history.

In order to prevent the illegal use of the electronic device, use authority lock such as a subscriber identity module (SIM) lock or a network lock may be configured in the electronic device.

The device identification number and the use authority lock may be used to authenticate the electronic device. For example, the electronic device may identify whether the electronic device is a normally registered device through the device identification information and release the use authority lock if the electronic device is the normally registered device.

DETAILED DESCRIPTION OF THE INVENTION

Technical Problem

Since there is presently no method to authenticate communication-related security data stored in an electronic device, instances of hacking or tampering with main data within an electronic device may occur. For example, nefariously acquiring an identification number, or illegally releasing the use authority lock (for example, a network access lock) after rooting (e.g., gaining complete access to) an electronic device may occur.

In addition, the existence of various network lock-related hacking cases, such as network lock manipulation, network lock mobile country code (MCC)/mobile network code (MNC) manipulation, network lock password manipulation, hacking of an allowed MCC/MNC list of an operator SIM, and data manipulation, is known.

Additionally, a terminal to be displayed (a local display unit (LDU) or a live demo unit) may fuse information (hereinafter, referred to as "LDU information" for convenience of description) indicating the LDU in a specific area (for example, a one-time programmable (OTP) area) of a memory, and thus may restrictively use a function of a communication processor (CP). However, since the LDU information cannot be modified after the LDU is used for the purpose of display, the function of the communication processor cannot be used and thus the reuse is not possible.

Various embodiments of the present disclosure provide an electronic device and a method of performing authentication by an electronic device, capable of generating a certificate for authenticating various types of communication-related security data stored in an electronic device (for example, IMEI/MEID, network lock/SIM lock information, production area/region-related data, a master subsidy lock (MSL), LDU information, a network control key (NCK) (for example, a network lock password), or an MCC/MNC list of a SIM which can be used by an operator) through an authentication server and authenticating communication-related security data through the certificate when various authentication events are generated.

Technical Solution

According to an aspect of the disclosure, an electronic device includes a communication circuit; and at least one processor operatively connected to the communication circuit, wherein the at least one processor is configured to identify generation of an authentication event for communication-related security data, in response to the generation of the authentication event, identify at least one piece of communication-related security data stored in a predetermined area of the electronic device, transmit a certificate request message including the at least one piece of identified communication-related security data to an authentication server through the communication circuit, receive a certificate generated based on at least the communication-related security data included in the transmitted certificate request message from the authentication server through the communication circuit, and authenticate use authority of the communication-related security data, based on the received certificate.

According to another aspect of the disclosure, a method of performing authentication by an electronic device includes identifying generation of an authentication event for communication-related security data; in response to the generation of the authentication event, identifying at least one piece of communication-related security data stored in a predetermined area of the electronic device; transmitting a certificate request message including the at least one piece of identified communication-related security data to an authentication server through a communication circuit; receiving a certificate generated based on at least the communication-related security data included in the transmitted certificate request message from the authentication server through the communication circuit; and authenticating use authority of the communication-related security data, based on the received certificate.

According to an aspect of the disclosure, an electronic device includes a communication circuit; a memory; and at least one processor operatively connected to the communication circuit, wherein the memory stores instructions configured to, when executed, cause the at least one processor to, identify generation of an authentication event for communication-related security data, in response to the generation of the authentication event, identify at least one piece of communication-related security data stored in a predetermined area of the electronic device, transmit a certificate request message including the at least one piece of identified communication-related security data to an authentication server through the communication circuit, receive a certificate generated based on at least the communication-related security data included in the transmitted certificate request message from the authentication server through the communication circuit, and authenticate use authority of the communication-related security data, based on the received certificate.

Advantageous Effects

According to various embodiments, preventing hacking may be possible due to a network lock change by generating a network lock-based certificate and to enhance security of a communication processor.

According to various embodiments, a certificate for authenticating various types of communication-related security data (for example, IMEI/MEID, network lock/SIM lock information, production area/region-related data, MSL, LDU information, an NCK (for example, a network lock password), or an MCC/MNC list of a SIM which can be used by an operator) may be generated through an authentication server and authenticated, and thus the communication-related security data cannot be manipulated. Further, since a certificate is generated through a specific authentication server, security may be improved by identifying whether the certificate is the certificate generated through the corresponding authentication server.

According to various embodiments, even after a terminal to be displayed (LDU or live demo unit) is used for the purpose of display, LDU information can be modified through authentication of the authentication server, and thus utilization of the LDU can be increased.

MODE FOR CARRYING OUT THE INVENTION

Figure 1:
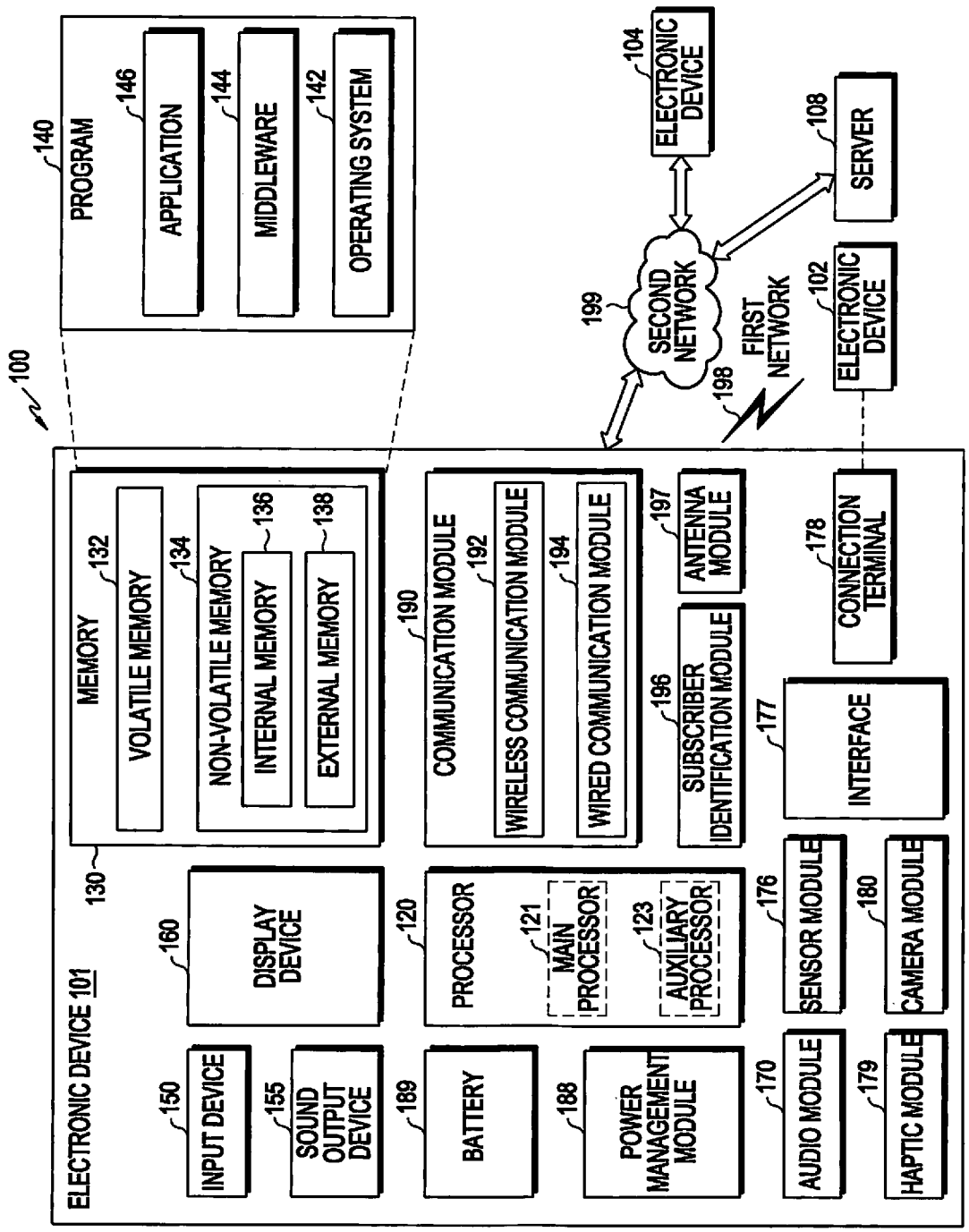
FIG. 1 illustrates a network environment, according to an embodiment.

Various embodiments of the disclosure are described with reference to the accompanying drawings. However, the embodiments and the terms used herein are not intended to limit the technology disclosed to specific implementation forms, and should be understood to include various modifications, equivalents, and/or alternatives to the corresponding embodiments. In describing the drawings, similar reference numerals may be used to designate similar elements.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by a component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module may include an antenna including a radiating element composed of a conductive material or a conductive pattern formed in or on a substrate (e.g., a printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
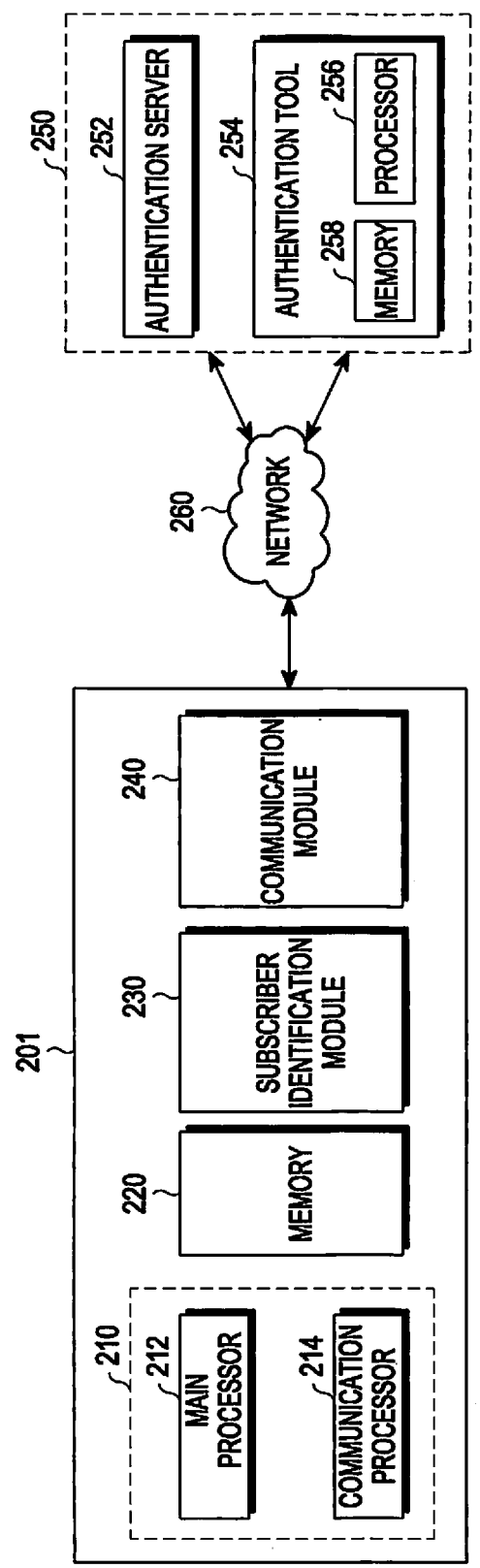
FIG. 2 is a block diagram illustrating a system including an electronic device and an authentication server, according to an embodiment.

FIG. 2 is a block diagram illustrating a system including an electronic device and an authentication server, according to an embodiment. Referring to FIG. 2, an electronic device 201 includes a processor 210, a memory 220, a subscriber identification module 230, or a communication module 240. The processor 210 may include at least one processor, for example, a main processor 212 and a communication processor 214 for performing a communication function through an interworking with the main processor 212. The main processor 212, the communication processor 214, the memory 220, the subscriber identification module 230, and the communication module 240 included in the electronic device 201 may be electrically and/or operatively connected to each other and may exchange signals (for example, commands or data) therebetween.

For example, the processor 210 of the electronic device 201, the main processor 212 and the communication processor 214 within the processor 210, the memory 220, the subscriber identification module 230, and the communication module 240 may be similar to the processor 120, the main processor 121 and the auxiliary processor 123 within the processor 120, the memory 130, the subscriber identification module 196, and the communication module 190 of FIG. 1.

The main processor 121 or the communication processor 214 of the electronic device 201 may communicate with an external electronic device 250 (for example, the electronic device 102 or the server 108 of FIG. 1) through a network 260 (for example, the first network 198 or the second network 199 of FIG. 1) or another element (for example, the communication module 190, the interface 177, or the connectivity terminal 178 of FIG. 1).

The main processor 212 may be the main processor 121 of FIG. 1 (for example, an Application Processor (AP)). According to various embodiments, the communication processor 214 may be the auxiliary processor 123 of FIG. 1 (for example, a Communication Processor (CP)).

The main processor 212 may control elements of the electronic device 201 including, for example, the communication processor 214, the memory 220, the subscriber identification module 230, and the communication module 240, and the overall operation of the electronic device 201. The main processor 212 may perform main security functions (for example, access to device identification information (for example, IMEI), checking or use of device identification information, communication with a base station or a higher node, and network access). The main processor 212 may control access to the network 260 through the communication processor 214 or communication through the network 260.

The communication processor 214 may perform a communication function through an interworking with the main processor 212. The communication processor 214 may access the network 260 or communicate with an external electronic device (for example, the electronic device 102 or the server 108 of FIG. 1, or a base station or a higher node) through the network 260. For access to the network 260 or communication through the network 260, the communication processor 214 may operate through an interworking with the main processor 212 or another element (for example, the communication module 190, the interface 177, the connectivity terminal 178, or a combination thereof in FIG. 1).

The subscriber identification module 230 may store device identification information (for example, a device identifier (for example, an IMEI) or a subscriber identifier (for example, an IMSI)) for identifying or authenticating the electronic device 201. The subscriber identification module 230 may be implemented, for example, in the form of a SIM card or in the form embedded into the electronic device (for example, an embedded SIM (eSIM)).

The subscriber identification module 230 may be implemented while being integrated into the main processor 212 or the communication processor 214. The subscriber identification module 230 may not be separately implemented, and device identification information for identifying or authenticating the electronic device 201 may be stored in the main processor 212 or the communication processor 214.

The electronic device 201 may be authenticated within the network 260 through the device identifier (for example, the IMEI) or the subscriber identifier (for example, the IMSI) stored in the subscriber identification module 230.

Authentication of the electronic device 201 may be performed by the communication processor 214. The communication processor 214 may authenticate the electronic device 201 through an interworking with the main processor 212 or another element (for example, the wireless communication module 190 of FIG. 1).

An event for authenticating communication-related security data may be generated in the electronic device 201. The communication-related security data may include an IMEI (for example, a single IMEI, a dual IMEI, or a third IMEI), an MEID, a carrier ID, a network lock or SIM lock-related information, production area/region-related data, MSL information, or LDU information. The network lock-related information may include a network lock password, an NCK, a master control key (MCK), a network subset code key (NSCK), a service provider control key (SPCK), a SIM/USIM lock (SIMCK), a corporate lock key (CPCK) network lock, SIM lock activation information, configuration information of each type of network lock or SIM lock, an allowed MCC/MNC list or a black MCC/MNC list of an operator SIM. The network lock password may include an NCK, an SP control key, an MCK, or a subset control key. The network lock activation information may include information indicating whether network locking or unlocking is activated. For example, the type of network lock may include a subset lock, an SP lock, a CP lock, and a USIM lock.

The event for authenticating the communication-related security data may be an event making a request for information on the electronic device 201 transmitted from the authentication server 252 to the electronic device 201. The event for authenticating the communication-related security data may include an event for configuring network lock of the electronic device 201, an event for configuring network unlock, an event for configuring a SIM lock, or an event for configuring SIM unlock.

The event for authenticating the communication-related security data may be an event related to at least one of requests for recording, deleting, changing, or updating the communication-related security data. The event for authenticating the communication-related security data may be an event making a request for changing a configuration of an LDU.

The processor 210 of the electronic device 201 may identify at least one piece of communication-related security data stored in a predetermined area of the electronic device 201 based on the generation of the event for authenticating the communication-related security data. At least one piece of communication-related security data may be stored in the memory 220 or the subscriber identification module 230, or may be stored in a storage area within the main processor 212 or the communication processor 214.

The processor 210 of the electronic device 201 may identify a device unique value (for example, at least one of a CP identifier (CP ID), an AP identifier (AP ID), an embedded multimedia card identifier (EMMC ID), or a universal flash storage identifier (UFS ID) corresponding to a hardware unique value) stored in a predetermined area of the electronic device 201.

The predetermined area may be at least a partial area of a mask read only memory (ROM) of which the content is fixed during a manufacturing process and thus cannot be changed). The predetermined area may be an OTP storage area.

The electronic device 201 may transmit at least one piece of the identified communication-related security data and/or an authentication request message including the identified device unique value to the external electronic device 250 through the network 260. The authentication server 252 of the external electronic device 250 may generate a certificate based on the at least one piece of communication-related security data and/or the device unique value.

The processor 210 of the electronic device 201 may receive the generated certificate from the authentication server 252 through the communication module 240 and authenticate the use authority of the communication-related security data based on the received certificate. Use authority lock (for example, a network access lock or a SIM card lock) of the communication-related security data may be configured in at least one of the main processor 212, the communication processor 214, or the subscriber identification module 230 within the electronic device 201 based on the authentication result.

The use authority lock may be for managing whether to approve main security functions performed by the main processor 212. For example, the use authority lock may be for managing authority (for example, a network access lock) to access the network 240 or to use communication through the network 240. Additionally or alternatively, the use authority lock may be for managing authority (for example, a SIM card lock) for device identification information (for example, an IMEI). The use authority lock may be released based on the authentication result. The use authority lock may be configured in at least one of the main processor 212, the communication processor 214, or the subscriber identification module 230, and may be released based on the authentication result. The use authority lock configured in each of the main processor 212, the communication processor 214, or the subscriber identification module 230 may be released based on the authentication result.

The external electronic device 250 may include the authentication server 252 or an authentication tool 254. The authentication server 252 or the authentication tool 254 may communicate with the electronic device 201 through the network 260 (for example, the first network 198 or the second network 199 of FIG. 1).

The external electronic device 250 may be implemented while being dualized into the authentication server 252 and the authentication tool 254. Although FIG. 2 illustrates the dualization into the authentication server 252 and the authentication tool 254, the external electronic device 250 may be implemented while being integrated into a single device. The authentication server 252 may generate a certificate (an electronic signature) using communication-related security data of the electronic device 201 and a device unique value.

When generating the certificate, the authentication server 252 may apply an asymmetric encryption algorithm for confidentiality. The asymmetric encryption algorithm may use two keys, such as a public key and a private key, as a pair of keys (a key pair). Data encrypted by the private key can be decoded by the public key.

After generating the certificate using the private key, the authentication server 252 may transmit the public key which makes a pair with the private key along with the certificate to the electronic device 201 for decoding in the electronic device 201.

The authentication tool 254 may receive at least one piece of information on communication-related security data and/or device unique values of the electronic device 201 to be authenticated and make a request for generating a certificate based on the information to the authentication server 252. The authentication tool 254 may record the certificate provided by the authentication server 252 in the electronic device 201. The authentication tool 254 may be independently implemented separately from the authentication server 252. The authentication tool 254 may be integrated within the authentication server 252 and may include one or more test circuits, a test kit, a jig box, or an interface (for example, a hardware or software interface). The authentication tool 254 may include a software element such as an application.

The authentication tool 254 may be used to authenticate the electronic device 201 in situations, for example, during a manufacturing process, during a production process, before being sold, or after being sold. The authentication tool 254 may store and manage values used for manufacturing the electronic device 201, such as various pieces of information (for example, a Wi-Fi key value, a key value for payment, device identification information, a lock address value, encryption data, and various test signal values) required for preforming authentication, a check, identification, examination, management, maintenance, or turning of the electronic device 201. The authentication tool 254 may input values for testing the electronic device 201 into the electronic device 201 to be authenticated and authenticate the electronic device 201 based on values returned in response thereto.

The authentication tool 254 may include a memory 258 and a processor 256 functionally connected to the memory 258. The processor 256 of the authentication tool 254 may be configured to perform an authentication operation. The processor 256 may transmit a request for authentication to the electronic device 201 and receive a device unique value stored in a predetermined area (for example, a mask ROM area or an OTP storage area) within the electronic device 201 from the electronic device 201 in response thereto. The processor 256 may acquire a certificate generated based on the device unique value and communication-related security data of the electronic device 201 from the authentication server 252 and transmit the certificate to the electronic device 201 to authenticate the electronic device 201. Authentication of the electronic device 201 may be for identifying whether the electronic device or the user is a normally registered device or a normally registered user.

When the authentication is completed, the electronic device 201 or the processor 214 of the electronic device 201 may release a pre-configured use authority lock. For example, when the use authority lock for at least one of the communication 214, the main processor 212, or the subscriber identification module 230 is configured, the configured use authority lock may be released according to the completion of the authentication. When the authentication is completed, the electronic device 201 can be used normally.

When the authentication is completed, the use authority lock (for example, the network access lock or the SIM card lock) of the electronic device 201 may be released and thus important security functions within the electronic device 201 may be used. For example, as the use authority lock is released, main security functions (for example, access to device identification information (for example, the IMEI), checking or use of device identification information, communication with a base station or a higher node, and access to the network 240) performed by the main processor 212 can be used.

Although FIG. 2 illustrates that the electronic device 201 receives the certificate from the authentication server 252 through the authentication tool 254, the electronic device 201 may receive the certificate through direct communication with the authentication server 252. At least some of the operations or functions of the authentication tool 254 may be performed by the electronic device 201 or the authentication server 252.

An electronic device may include a communication circuit (for example, the communication module 240); and at least one processor 210 (for example, the main processor 212 or the communication processor 214) operatively connected to the communication circuit, wherein the at least one processor may be configured to identify generation of an authentication event for communication-related security data, in response to the generation of the authentication event, identify at least one piece of communication-related security data stored in a predetermined area of the electronic device, transmit a certificate request message including the at least one piece of identified communication-related security data to an authentication server through the communication circuit, receive a certificate generated based on at least the communication-related security data included in the transmitted certificate request message from the authentication server through the communication circuit, and authenticate use authority of the communication-related security data, based on the received certificate.

The communication-related security data may include at least one of an IMEI, an MEID, a carrier ID, network lock or SIM lock-related information, generated area/region-related data, MSL information, or LDU information.

The network lock-related information may include at least one of a network lock password, an NCK, an MCK, an NSCK, an SPCK, a SIM/USIM lock (SIMCK), a CPCK network lock or SIM lock activation information, configuration information of each type of network lock or SIM lock, or an allowed MCC/NMC list or a black MCC/MNC list of an operator SIM.

The authentication event may include a request for information on the electronic device transmitted from the authentication server.

The authentication event may include an event for configuring network lock of the electronic device or an event for configuring network unlock.

The authentication event may include at least one of a request for recording, deleting, changing, or updating the communication-related security data.

The authentication event may include a request for changing a configuration of LDU information.

The at least one processor may include at least one of an AP or a CP.

The at least one processor may be configured to calculate an external hash value by decoding the certificate using a public key received together with the certificate, identify the communication-related security data stored in the electronic device, calculate an internal hash value, based on the communication-related security data, and determine whether authentication is performed by comparing the external hash value and the internal hash value.

The certificate may be generated based on the communication-related security data and a unique value of the at least one processor.

Figure 3:
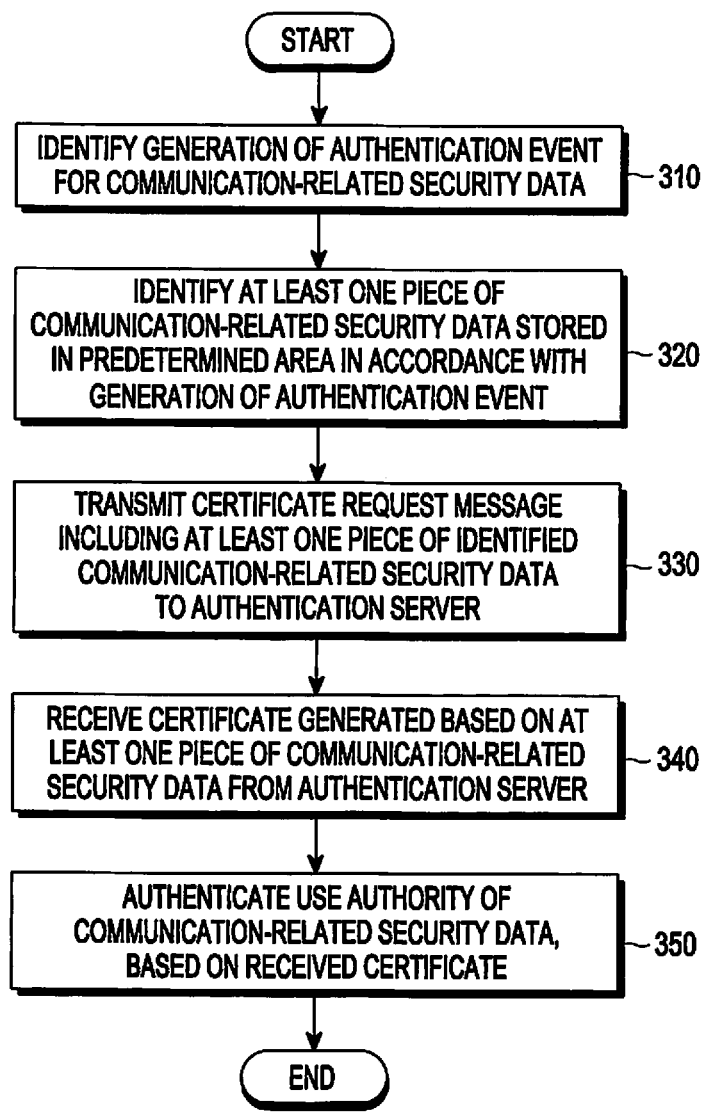
FIG. 3 is a flowchart illustrating a method of performing authentication by an electronic device, according to an embodiment.
Figure 4:
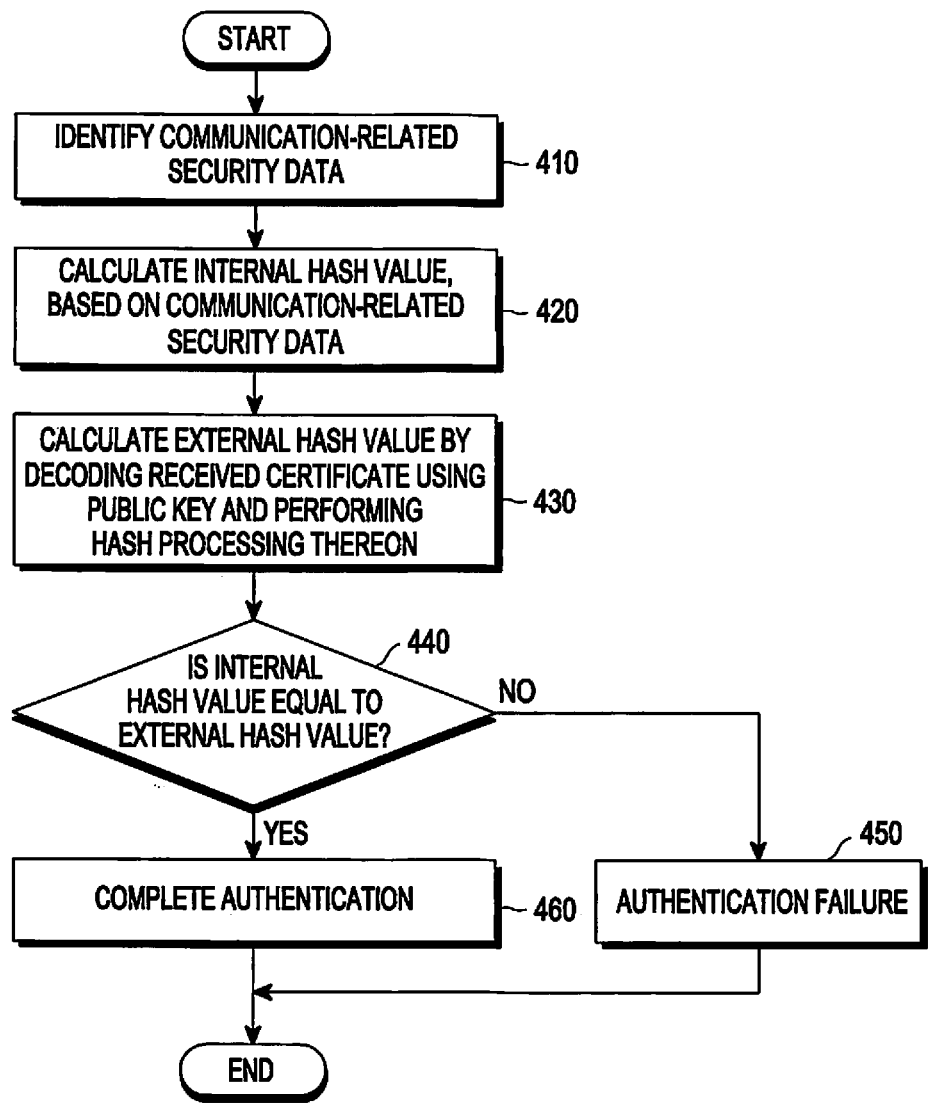
FIG. 4 is a flowchart illustrating a method of performing authentication by an electronic device, according to an embodiment.

FIGS. 3 and 4 are flowcharts illustrating methods of authenticating an electronic device, according to various embodiments. The authentication method illustrated in FIGS. 3 and 4 may be performed by the electronic device 201, the main processor 212 or the communication processor 214 of the electronic device 201. The electronic device 201 may be configured to perform operations of the authentication method. At least one of the operations of the authentication method may be omitted, the order of some operations may be changed, or another operation may be added.

Referring to FIG. 3, the authentication method includes operations 310 to 350.

In operation 310, the electronic device 201 identifies the generation of an event for authenticating communication-related security data. For example, the communication-related security data may include an IMEI, an MEID, a carrier ID, a network lock or SIM lock-related information, production area/region-related data, MSL information, or LDU information. The network lock-related information may include a network lock password, an NCK, an MCK, an NSCK, an SPCK, a SIMCK, a CPCK network lock, SIM lock activation information, configuration information of each type of network lock or SIM lock, or an allowed MCC/MNC list or a black MCC/MNC list of an operator SIM. The network lock password may include an NCK, an SP control key, an MCK, or a subset control key. The network lock activation information may include information indicating whether network lock or unlock is activated. For example, the type of network lock may include a subset lock, an SP lock, a CP lock, and a USIM lock.

The event for authenticating the communication-related security data may be an event making a request for information on the electronic device 201 transmitted from the authentication server 252 to the electronic device 201. The event for authenticating the communication-related security data may include an event for configuring network lock of the electronic device 201, an event for configuring network unlock, an event for configuring a SIM lock, or an event for configuring a SIM unlock. The event for authenticating the communication-related security data may be an event related to at least one of requests for recording, deleting, changing, or updating the communication-related security data. The event for authenticating the communication-related security data may be an event making a request for changing a configuration of an LDU.

According to the generation of the event for authenticating the communication-related security data, the processor 210 of the electronic device 201 may identify at least one piece of communication-related security data stored in a predetermined area of the electronic device 201. At least one piece of communication-related security data may be stored in the memory 220 or the subscriber identification module 230, or may be stored in a storage area within the main processor 212 or the communication processor 214.

In operation 320, the electronic device 201 identifies at least one piece of communication-related security data stored in a predetermined area in response to the generation of the authentication event.

At least one of the communication processor 214, the main processor 212, or the memory 220 within the electronic device 201 may include a predetermined area (for example, a mask ROM area or an OTP storage area).

Each of the communication processor 214, the main processor 212, or the memory 220 within the electronic device 201 may include a predetermined area.

The communication processor 214 may identify communication-related security data and/or a device unique value from the predetermined area included in at least one of the communication processor 214, the main processor 212, or the memory 220 within the electronic device 201. The device unique value may be a value stored in the mask ROM, stored in the OTP area, or recorded in the OTP area through fusing.

The device unique value may be a value in a unit of chipsets. The predetermined area is a storage value in the type which can be programmed only one time, and may have a characteristic in which additional recording is permanently impossible once recording is performed one single time. For example, the predetermined area may be implemented in the form of a semiconductor chip or a circuit included in the electronic device 201.

Additionally or alternatively, the predetermined area may be implemented in the form of at least some storage areas included in the communication processor 214, the main processor 212, or the memory 220 within the electronic device 201.

A value recorded in the predetermined area may have a characteristic of a hardware-based value, a physical value, or a permanent value. The device unique value used in the certificate may have a characteristic of being recorded in hardware and permanently fixed. The value stored in the predetermined area is a fixed value in hardware, and thus cannot be randomly changed, forged, or falsified, unlike a software value. For example, even the same model of several electronic devices may have different values stored in the predetermined area due to a difference in a manufacturing process or an environment.

In operation 330, the electronic device 201 transmits a certificate request message including at least one piece of the identified communication-related security data to the authentication server 252. The certificate request message may further include data (for example, a device unique value) other than at least one piece of the communication-related security data. A security data set including at least one piece of the communication-related security data and the device unique value may be inserted into the certificate request message and then transmitted to the authentication server 252.

In operation 340, the electronic device 201 receives a certificate generated based on at least the communication-related security data included in the transmitted certificate request message. The authentication server 252 may generate, in real time, the device unique value and at least one piece of the communication-related security data included in the certificate request message received from the electronic device 201 and provide the generated certificate to the electronic device 201. The authentication server 252 may generate a certificate (an electronic signature) by encrypting the device unique value and at least one piece of the communication-related security data using a pre-stored private key. The certificate may be transmitted to the electronic device 201 along with a public key corresponding to the private key.

In operation 340 may be repeatedly performed when authentication is attempted again. In addition, operation 40 may be periodically performed.

In operation 350, the electronic device 201 authenticates the use authority of communication-related security data based on the received certificate.

When a root public key is pre-stored in the electronic device 201 and the certificate and the public key are received, the electronic device 201 may check whether the received public key is valid using the root public key. When the public key is valid based on the check result, the electronic device 201 may decode the received certificate using the public key.

Accordingly, whether to release a use authority lock of the main security function (for example, network access, or access to, checking of, or use of device identification information (for example, IMEI)) of the main processor 212 may be determined within the electronic device 201 based on the authentication in operation 350.

The electronic device 201 performing the authentication operations (for example, operations 310 to 350) may be the auxiliary processor 123 of FIG. 1 (for example, communication processor) or the main processor 121 of FIG. 1 (for example, application processor). The device unique value may include a first unique value (for example, CP ID) stored in a predetermined area of the communication processor 214 within the electronic device 201.

Since the main processor 212 is able to customize the electronic device 201 by rooting (through an acquisition of administrator authority that is privileged to provide control over the electronic device 201), hacking (for example, tampering of main data or unauthorized release of the use authority) may be relatively easy and problematic. By allowing the communication processor 214, rather than the main processor 212, to have rooting access to authenticate the electronic device 201, security may be further enhanced to prevent hacking. A hardware-based unique value of the communication processor 214 which authenticates the electronic device 201 may be used for authentication, and thus more accurate and efficient authentication may be possible.

The device unique value may further include at least one of a second unique value (for example, an AP ID) stored in a predetermined area of the main processor 212 within the electronic device 201 or a third unique value (for example, an EMMC ID or a UFS ID) stored in a predetermined area of the memory 220 within the electronic device 201. Since a unique value stored in a predetermined area in which tampering or recording (writing) is impossible is used for authenticating the electronic device 201, security and integrity may be further enhanced.

The authentication in step 350 may be real time authentication that does not store the received certificate. When the certificate is stored in the electronic device 201, hacking may be possible or security vulnerabilities may appear. Thus, the electronic device 201 may use the certificate for the purpose of real time authentication between the external electronic device 250 and the electronic device 201 and may not store the certificate in the electronic device 201.

FIG. 4 is a flowchart illustrating a method of performing authentication by an electronic device, according to an embodiment. Referring to FIG. 4, the authentication method includes 410 to 460.

In operation 410, the electronic device 201 identifies communication-related security data stored in the electronic device 201. The electronic device 201 may read a unique value (for example, a CP ID) stored in a predetermined area (for example, a mask ROM area or an OTP storage area of a chipset implementing the communication processor 214) within the electronic device 201 as an internal device unique value. The electronic device 201 may additionally read a unique value (for example, an AP ID) stored in a predetermined area of the main processor 212 or a unique value (for example, an EMMC ID or a UFS ID) stored in a predetermined area of the memory 220 as the internal device unique value.

In operation 420, the electronic device 201 calculates an internal hash value based on the identified communication-related security data.

In operation 430, the electronic device 201 decodes the certificate received from the authentication server 252 using the public key received along with the certificate. The electronic device 201 may calculate an external hash value based on data included in the decoded certificate.

In operation 440, the electronic device 201 determines whether authentication is performed by comparing the external hash value calculated in operation 420 with the internal hash value calculated in operation 430.

When the internal hash value and the external hash value are the same or are within the same range based on the comparison result of operation 440, the electronic device 201 determines that the electronic device 201 is completely authenticated in operation 460.

When the internal hash value and the external hash value are different or are not within the same range based on the comparison result of operation 440, the electronic device 201 determines that the authentication of the electronic device 201 fails (the electronic device 201 is not authenticated) in operation 450.

The electronic device 201 may determine authentication failure based on a predetermined number of authentication failures. For example, before operation 440, the electronic device 201 may identify whether the current number of authentication attempts exceeds the number of authentication failures. When the internal hash value and the external hash value are different or are not within the same range based on the comparison result of operation 440, the electronic device 201 may return to operation 430 and attempt the authentication again.

When attempting the authentication again, the electronic device 201 may repeatedly perform operation 430 by receiving a new certificate again and calculating an external hash value from the certificate, operation 440 by comparing the pre-calculated hash value with the external hash value calculated again in operation 430, and operation 460 or 450 by determining authentication completion or authentication failure according to the comparison result of operation 440.

When the number of authentication attempts exceeds the predetermined number of authentication failures, it is determined that the authentication fails in operation 450 and authentication of the electronic device 201 may be impossible.

When the number of authentication attempts is less than or equal to the predetermined number of authentication failures, the electronic device 201 may proceed to operation 430 and attempt the authentication again within the number of authentication failures.

In the authentication method, the order of the operations may be changed. For example, the operation of determining the number of authentications may be performed before or after one of operations 430 and 440. Although FIG. 4 illustrates that, when the number of authentication attempts is within the range of the number of authentication failures, the electronic device proceeds to operation 430 to attempt the authentication again and calculates the external hash value again from the re-received certificate, the electronic device may return to one of operations 430 or 440 and attempt the authentication again. When the number of authentication failures is limited, a brute force attack may be prevented and thus security may be further enhanced.

Figure 5:
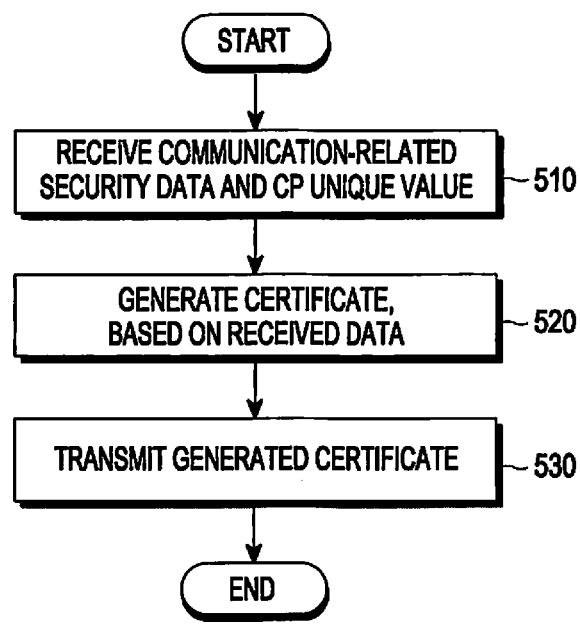
FIG. 5 is a flowchart illustrating a method of generating a certificate by an authentication server, according to an embodiment.

FIG. 5 is a flowchart illustrating a method of generating a certificate by an authentication server, according to an embodiment. Referring to FIG. 5, in operation 510, the authentication server 252 may receive a certificate request message including communication-related security data and a device unique value (for example, a CP unique value) stored in a predetermined area within the electronic device 201 from the electronic device 201.

In operation 520, the authentication server 252 generates the certificate based on the received data.

The authentication server 252 may generate a certificate (an electronic signature) using communication-related security data of the electronic device 201 and a device unique value. When generating the certificate, the authentication server 252 may apply an asymmetric encryption algorithm for confidentiality. The asymmetric encryption algorithm may use two keys, such as a public key and a private key, as a pair of keys (a key pair). Data encrypted by the private key can be decoded by the public key.

After generating the certificate using the private key, in operation 530, the authentication server 252 transmits the public key which makes a pair with the private key to the electronic device 201 along with the certificate for decoding in the electronic device 201.

A method of performing authentication by the electronic device may include an operation of identifying generation of an authentication event for communication-related security data, an operation of identifying at least one piece of communication-related security data stored in a predetermined area of the electronic device in response to the generation of the authentication event, an operation of transmitting a certificate request message including the at least one piece of identified communication-related security data to an authentication server through a communication circuit (for example, the communication module 240), an operation of receiving a certificate generated based on at least the communication-related security data included in the transmitted certificate request message from the authentication server through the communication circuit, and an operation of authenticating use authority of the communication-related security data, based on the received certificate.

The communication-related security data may include at least one of an IMEI, an MEID, a carrier ID, a network lock or SIM lock-related information, generated area/region-related data, MSL information, or LDU information.

The network lock-related information may include at least one of a network lock password, an NCK, an MCK, an NSCK, an SPCK, an SIMCK, a CPCK network lock or SIM lock activation information, configuration information of each type of network lock or SIM lock, or an allowed MCC/NMC list or a black MCC/MNC list of an operator SIM.

The authentication event may include a request for information on the electronic device transmitted from the authentication server.

The authentication event may include an event for configuring network lock or SIM lock of the electronic device or an event for configuring a network/SIM unlock.

The authentication event may include at least one of a request for recording, deleting, changing, or updating the communication-related security data.

The authentication event may include a request for changing a configuration of LDU information.

The method may further include an operation of calculating an external hash value by decoding the certificate using a public key received together with the certificate, an operation of identifying the communication-related security data stored in the electronic device, an operation of calculating an internal hash value, based on the communication-related security data, and an operation of determining whether authentication is performed by comparing the external hash value and the internal hash value.

The certificate may be generated based on the communication-related security data and a unique value of the at least one processor.

Figure 6:
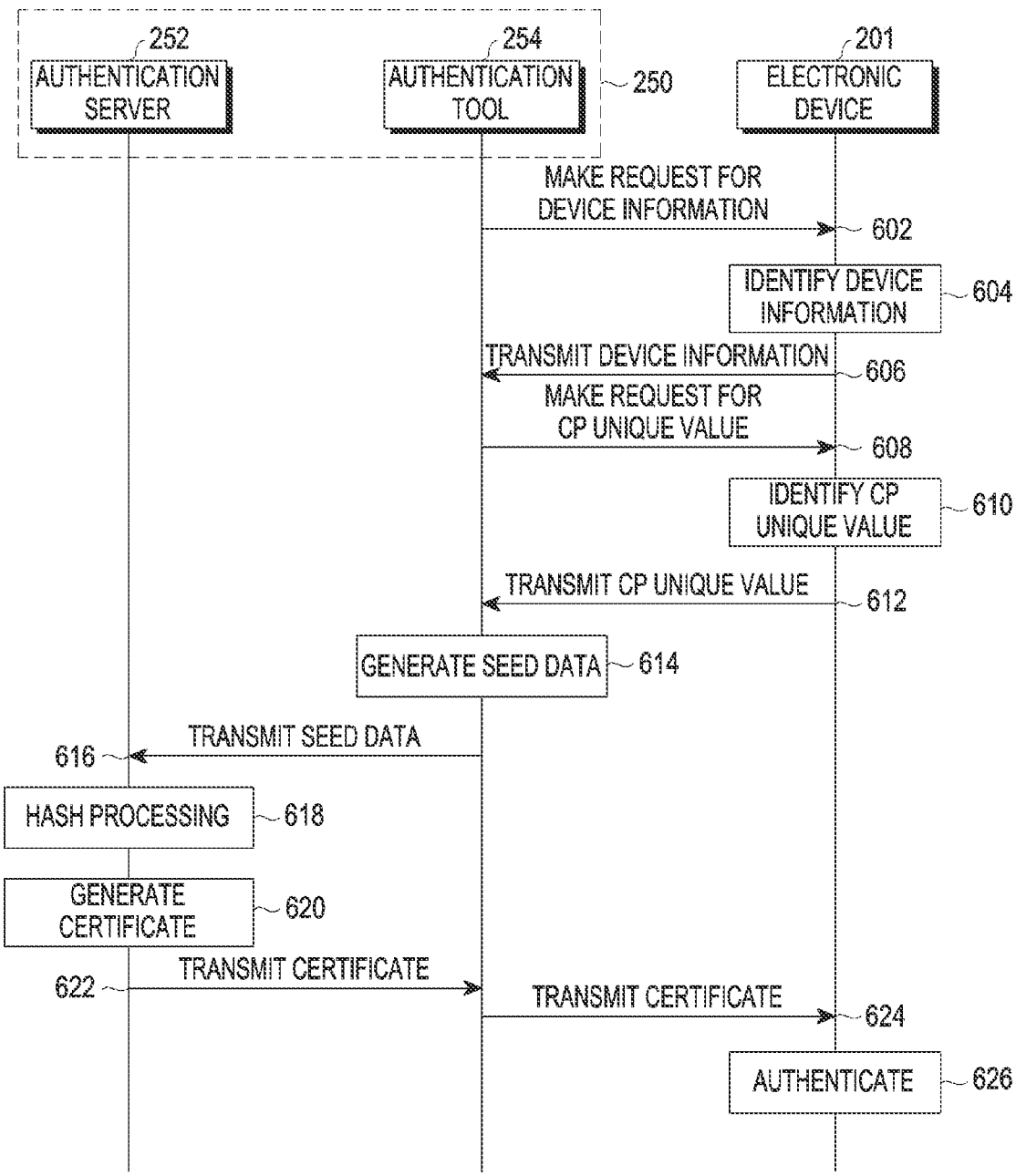
FIG. 6 is a signal flowchart illustrating a method of performing authentication by a system, according to an embodiment.

FIG. 6 is a signal flowchart illustrating an authentication method in a system, according to an embodiment. Although FIG. 6 illustrates that the external electronic device 250 is binarized into the authentication server 252 and the authentication tool 254, the authentication server 252 and the authentication tool 254 may be integrated and implemented as one external electronic device 250. Values (for example, lock address values) for authentication of the electronic device 201 may be pre-stored in the authentication tool 254.

In operation 602, the authentication tool 254 identifies the electronic device 201 to be authenticated to generate a certificate (an electronic signature) for the electronic device 201 and makes a request for device information for authentication to the electronic device 201. The device information may include at least one piece of communication-related security data.

In operation 604, the electronic device 201 identifies the device information in response to the request from the authentication tool 254. The device information (for example, communication-related security data) may include an IMEI, an MEID, a carrier ID, a network lock or SIM lock-related information, production area/region-related data, MSL information, or LDU information. The network lock-related information may include a network lock password, an NCK, an MCK, an NSCK, an SPCK, an SIMCK, a CPCK network lock, SIM lock activation information, configuration information of each type of network lock or SIM lock, or an allowed MCC/MNC list or a black MCC/MNC list of an operator SIM. The network lock password may include an NCK, an SP control key, an MCK, or a subset control key. The network lock activation information may include information indicating whether a network lock or unlock is activated. For example, the type of network lock may include a subset lock, an SP lock, a CP lock, and a USIM lock.

In operation 606, the electronic device 201 transmits the identified device information to the authentication tool 254.

In operation 608, the authentication tool 254 makes a request for a device unique value (for example, CP unique value) to the electronic device 201. In operation 610, the electronic device 201 identifies the device unique value in response to the request from the authentication tool 254. In operation 612, the electronic device 201 transmits the identified CP unique value to the authentication tool 254.

In operation 614, the authentication tool 254 generates a key for generating a certificate based on project information (for example, a model name), device information (for example, communication-related security data), and the CP unique value as seed data. In operation 616, the authentication tool 254 transmits the generated seed data to the authentication server 252.

In operation 618, the authentication server 252 performs hash processing on the seed data including the device information (for example, communication-related security data) and the device unique value. The authentication server 252 may calculate a hash value of the seed data by applying a hash function in order to reduce the length of the seed data. In an authentication scheme using a certificate, it takes a longer time to process data as the size of data is larger, and thus the processing time may be reduced through hash processing.

The authentication server 252 may insert a valid time for determining whether the certificate expires into the seed data and perform hash processing thereon. In this case, authentication using the certificate can be performed for a specific time designated by the valid time, and thereafter the authentication may be performed after receiving a certificate again through the authentication server 252.

In operation 620 and operation 622, the authentication server 252 generates a certificate based on the seed data on which processing has been performed and transmits the certificate to the authentication tool 254. The authentication server 252 may encrypt a hash value of the seed data using the private key to generate a certificate. In order to decode the certificate, the authentication server 252 may transmit a public key which makes a pair with the private key to the authentication tool 254 along with the certificate.

In operation 624, the authentication tool 254 transmits the certificate generated based on the seed data including the device information (for example, communication-related security data) and the device unique value to the electronic device 201.

In operation 626, the electronic device 201 authenticates the use authority of the electronic device 201 (for example, use authority of the communication-related security data) based on the received certificate.

Accordingly, security may be enhanced through the certificate using the unique value of the electronic device 201 separately from the pre-stored values for authentication in the external electronic device 250.

Additionally, the authentication server 252 may generate the certificate in real time, and transmit it in response to reception of the seed data including the device unique value. The electronic device 201 may perform real time authentication that does not store the certificate received from the authentication server 252. Since the certificate is generated in real time and the certificate is used only during a run time for which the authentication operation is performed, security may be further enhanced.

In generating the certificate in operation 620, the authentication server 252 may insert the valid time into the certificate. In performing authentication in operation 626, the electronic device 201 may determine whether the certificate expires based on the valid time of the certificate. In this case, since authentication using the certificate is restrictively possible only during a specific time designated by the valid time, security may be further enhanced.

Figure 7:
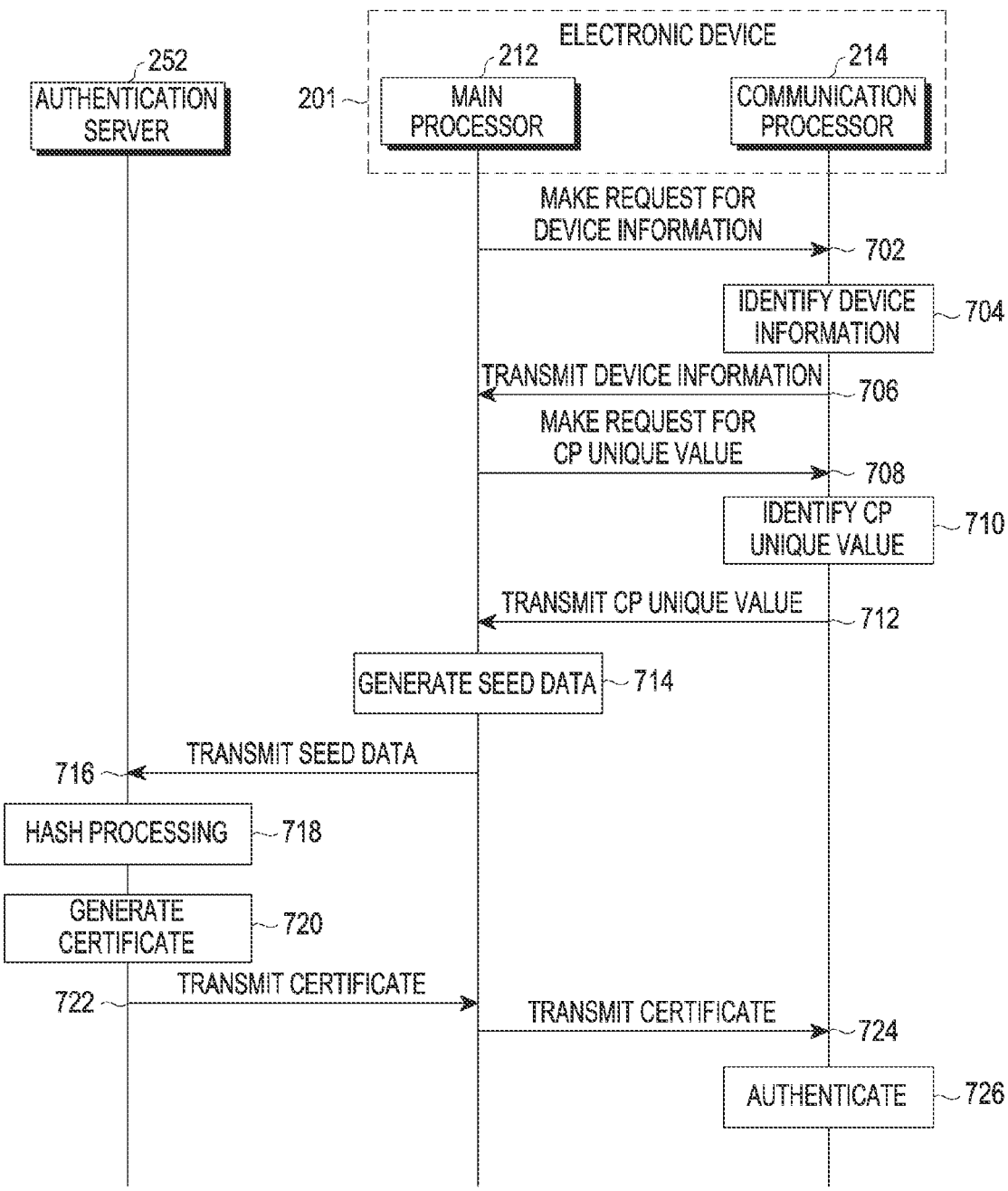
FIG. 7 is a signal flowchart illustrating an authentication method in a system, according to an embodiment.

FIG. 7 is a signal flowchart illustrating a method of performing authentication by a system, according to an embodiment. Referring to FIG. 7, at least some of the operations performed by the authentication tool 254 in FIG. 6 may be performed by the electronic device 201. For example, the operations performed by the authentication tool 254 may be performed by the main processor 212 of the electronic device 201. An application for authenticating the use authority of the communication-related security data may be installed in the electronic device 201, and the main processor 212 may authenticate the use authority of the communication-related security data according to execution of the installed application. For example, the operation of the main processor 212 may be implemented as the operation according to the execution of the installed application in FIG. 7.

In operation 702, the main processor 212 of the electronic device 201 makes a request for device information for authentication to the communication processor 214 in order to generate a certificate (an electronic signature) for the electronic device 201. The device information may include at least one piece of communication-related security data.

In operation 704, the communication processor identifies device information in response to a request from the main processor 212. The device information (for example, communication-related security data) may include an IMEI, an MEID, a carrier ID, a network lock or SIM lock-related information, production area/region-related data, MSL information, or LDU information. The network lock-related information may include a network lock password, an NCK, an MCK, an NSCK, an SPCK, an SIMCK, a CPCK network lock, SIM lock activation information, configuration information of each type of network lock or SIM lock, or an allowed MCC/MNC list or a black MCC/MNC list of an operator SIM. The network lock password may include an NCK, an SP control key, an MCK, or a subset control key. The network lock activation information may include information indicating whether a network lock or unlock is activated. The type of network lock may include a subset lock, an SP lock, a CP lock, and a USIM lock.

in step 706, the communication processor 214 transmits the identified device information to the main processor 212.

In step 708, the main processor 212 makes a request for a device unique value (for example, a CP unique value) to the communication processor 214. In operation 710, the communication processor 214 identifies the device unique value in response to the request from the main processor 212. In step 712, the communication processor 214 transmits the identified CP unique value to the main processor 212.

In operation 714, the main processor 212 generates a key for generating a certificate based on project information (for example, a model name), device information (for example, communication-related security data), and the CP unique value as seed data. In operation 716, the main processor 212 transmits the generated seed data to the authentication server 252.

In operation 718, the authentication server 252 performs hash processing on the seed data including the device information (for example, communication-related security data) and the device unique value. The authentication server 252 may calculate a hash value of the seed data by applying a hash function in order to reduce the length of the seed data. In an authentication scheme using a certificate, it takes a longer time to process data as the size of data is larger, and thus the processing time may be reduced through hash processing.

The authentication server 252 may insert a valid time for determining whether the certificate expires into the seed data and perform hash processing thereon. In this case, authentication using the certificate can be performed for a specific time designated by the valid time, and thereafter the authentication may be performed after receiving a certificate again through the authentication server 252.

In operation 720 and operation 722, the authentication server 252 generates a certificate based on the seed data on which processing has been performed and transmits the generated certificate to the electronic device 201. The authentication server 252 may encrypt a hash value of the seed data using the private key to generate a certificate. The authentication server 252 may transmit a public key which makes a pair with the private key to the electronic device 201 along with the certificate to decode the certificate.

In operation 724, the main processor 212 of the electronic device 201 may transmit the certificate generated based on the seed data including the device information (for example, communication-related security data) and the device unique value to the communication processor 214.

In step 726, the communication processor 214 authenticates use authority (for example, use authority of the communication-related security data) of the communication processor 214 based on the received certificate.

Accordingly, security may be enhanced through the certificate using the unique value of the electronic device 201 separately from the pre-stored values for authentication in the external electronic device 250.

The authentication server 252 may generate in real time and transmit the certificate in response to reception of the seed data including the device unique value. The electronic device 201 may perform real time authentication that does not store the certificate received from the authentication server 252. Since the certificate is generated in real time and the certificate is used only during a run time for which the authentication operation is performed, security may be further enhanced.

The authentication server 252 may insert the valid time into the certificate in generating the certificate in operation 720. In operation 726, the electronic device 201 may determine whether the certificate expires based on the valid time of the certificate. In this case, since authentication using the certificate is restrictively possible only during a specific time designated by the valid time, security may be further enhanced.

Figure 8:
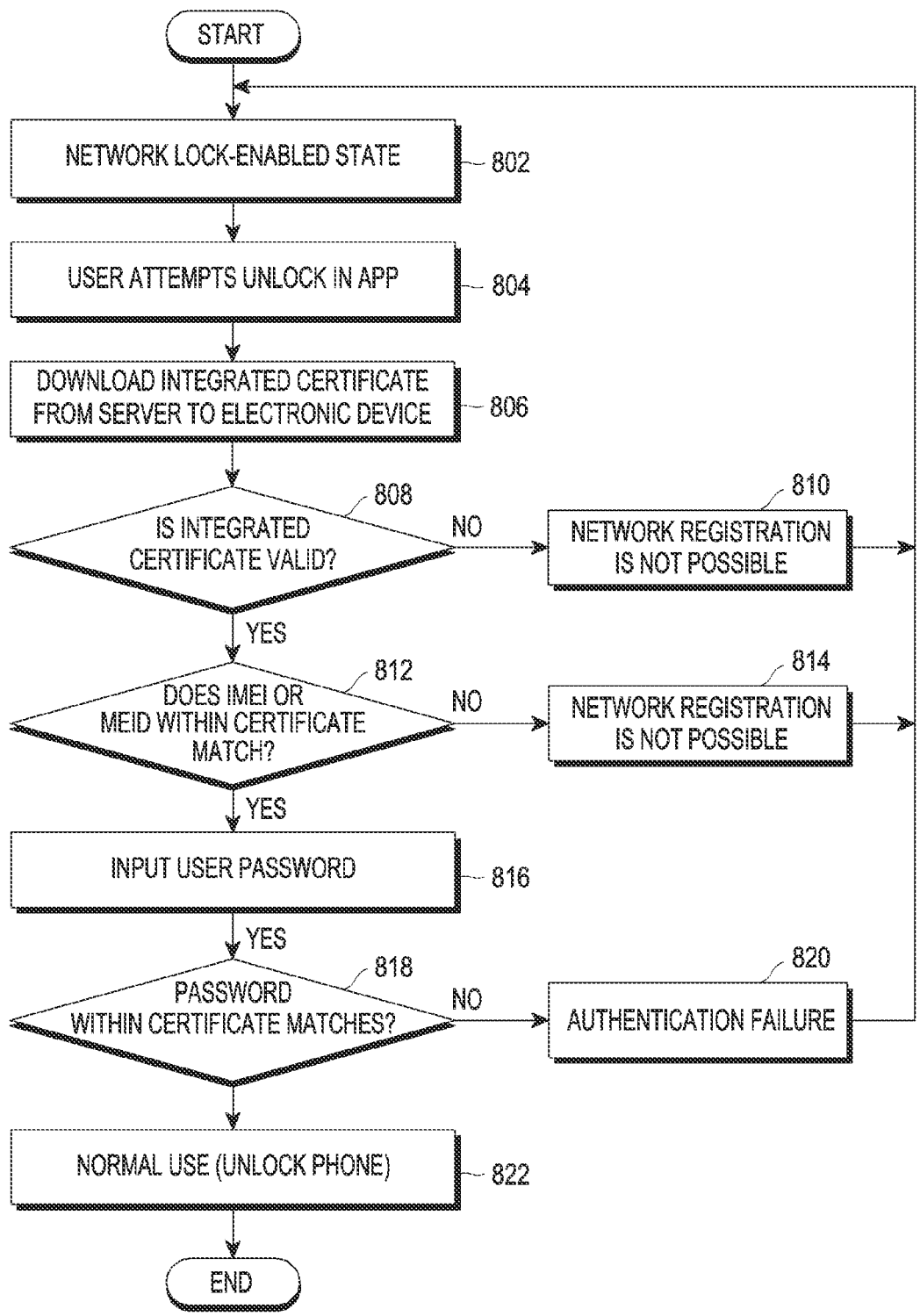
FIG. 8 is a flowchart illustrating an authentication method for releasing a network lock by an electronic device, according to an embodiment.

FIG. 8 is a flowchart illustrating an authentication method for releasing network lock by an electronic device, according to an embodiment. Referring to FIG. 8, in operation 802, the electronic device 201 is in a network lock-enabled state.

In operation 804, when the user attempts network unlock through a specific application installed in the electronic device 201, the attempt of network unlock is determined as the generation of an event for authenticating communication-related security data.

The electronic device 201 may identify the generation of the event for authenticating the communication-related security data, identify at least one piece of communication-related security data stored in a predetermined area of the electronic device 201, and transmit a certificate request message including at least one piece of the identified communication-related security data to the authentication server 252 through the communication circuit.

In operation 806, the certificate generated based on at least the communication-related security data included in the transmitted certificate request message is downloaded from the authentication server. In step 808, the validity of the certificate (for example, integrated certificate) downloaded from the authentication server is determined. Whether the certificate is valid may be determined by identifying an expiration date of the certificate.

When the certificate is determined not valid based on the determination result, processing indicating that network registration is not possible is performed in operation 810. When the certificate is determined to be valid based on the determination result, it is determined whether an IMEI or an MEID within the certificate matches the IMEI or the MEID stored in the electronic device 201 in operation 812. When the IMEI or the MEID within the certificate does not match the IMEI or the MEID in the electronic device based on the determination result, processing indicating that network registration is not possible is performed in operation 814. When the IMEI or the MEID within the certificate matches the IMEI or the MEID stored in the electronic device 201 based on the determination result, a user password is input through the screen of the electronic device 201 in operation 816.

In operation 818, it is determined whether the user password input by the user matches the password within the certificate. When the user password input by the user does not match the password within the certificate based on the determination result, authentication failure is processed in operation 820. When the user password input by the user matches the password within the certificate based on the determination result, authentication success is processed and the electronic device is processed to be normally used as an unlocked electronic device in operation 822. For example, the network lock state stored in the electronic device 201 may be changed to the network lock disabled-state.

Figure 9:
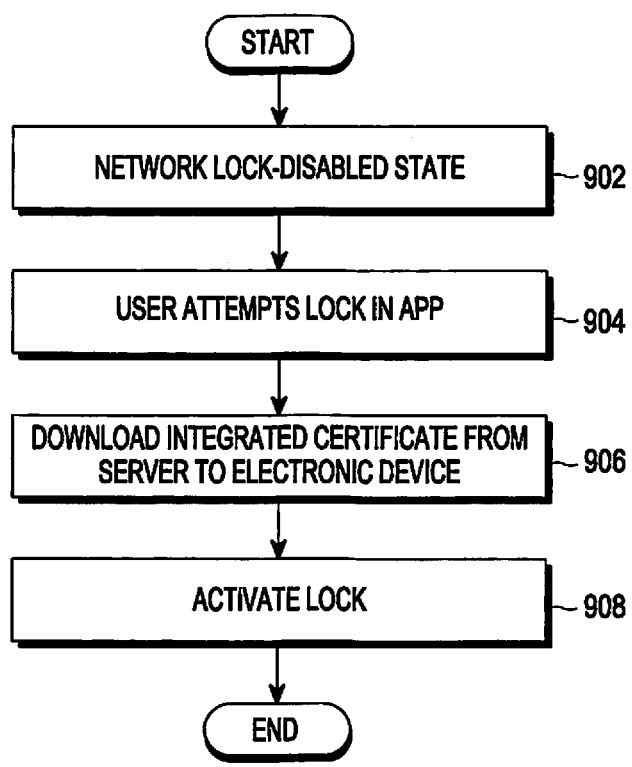
FIG. 9 is a flowchart illustrating an authentication method for configuring a network lock by an electronic device, according to an embodiment.

FIG. 9 is a flowchart illustrating an authentication method for configuring network lock by an electronic device, according to an embodiment. Referring to FIG. 9, in operation 902, the electronic device 201 is in the network lock-disabled state.

In operation 904, when the user attempts a network lock through a specific application installed in the electronic device 201, the network lock attempt may be determined as the generation of an event for authenticating communication-related security data.

The electronic device 201 may identify the generation of the event for authenticating the communication-related security data, identify at least one piece of communication-related security data stored in a predetermined area of the electronic device 201, and transmit a certificate request message including at least one piece of the identified communication-related security data to the authentication server 252 through the communication circuit.

In operation 906, the certificate generated based on at least the communication-related security data included in the transmitted certificate request message is downloaded from the authentication server. In addition, the validity of the certificate (for example, an integrated certificate) downloaded from the authentication server may be determined.

When it is determined that the certificate is valid based on the determination result, the use authority of the communication-related security data may be authenticated based on the received certificate. For example, when the use authority is normally authenticated based on the authentication result, authentication success may be processed, and the network lock state stored in the electronic device 201 may be changed to the network lock-enabled state in operation 908.

Figure 10:
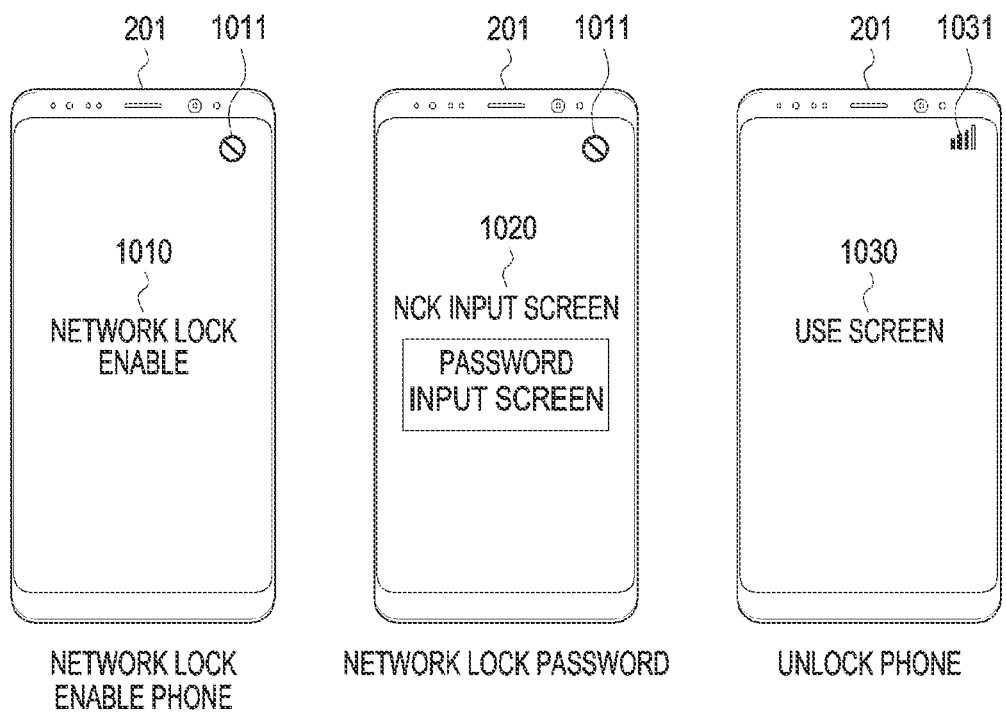
FIGS. 10A, 10B, and 10C illustrate network lock release screens in an electronic device, according to various embodiments.

FIGS. 10A, 10B, and 10C illustrate network lock release screens in an electronic device according to various embodiments. Referring to FIG. 10A, when the electronic device 201 is currently in the network lock-enabled state, the electronic device may currently display the network lock-enabled state on a screen 1010. Due to the network lock-enabled state, the network function of the electronic device 201 may be limited, and an image 1011 indicating that the network cannot be used may be displayed on a state display bar on the top of the electronic device 201.

Referring to FIG. 10B, when the user desires to release the lock in the current network lock-enabled state of the electronic device 201, the electronic device may determine that the network lock release attempt is the generation of an event for authenticating communication-related security data and make a request for a certificate to the authentication server 252. The electronic device 201 may receive the certificate from the authentication server 252 and display a password input screen 1020 for a password from the user. The authentication may be performed through the received certificate based on the password input by the user, and when normal authentication is performed, the state may be changed to the network lock-disabled state as illustrated in FIG. 10C. Since the normal network function can be used in the network lock-disabled state, an image 1031 indicating the network use function may be displayed on a state display bar on the top of the electronic device 201.

Figure 11:
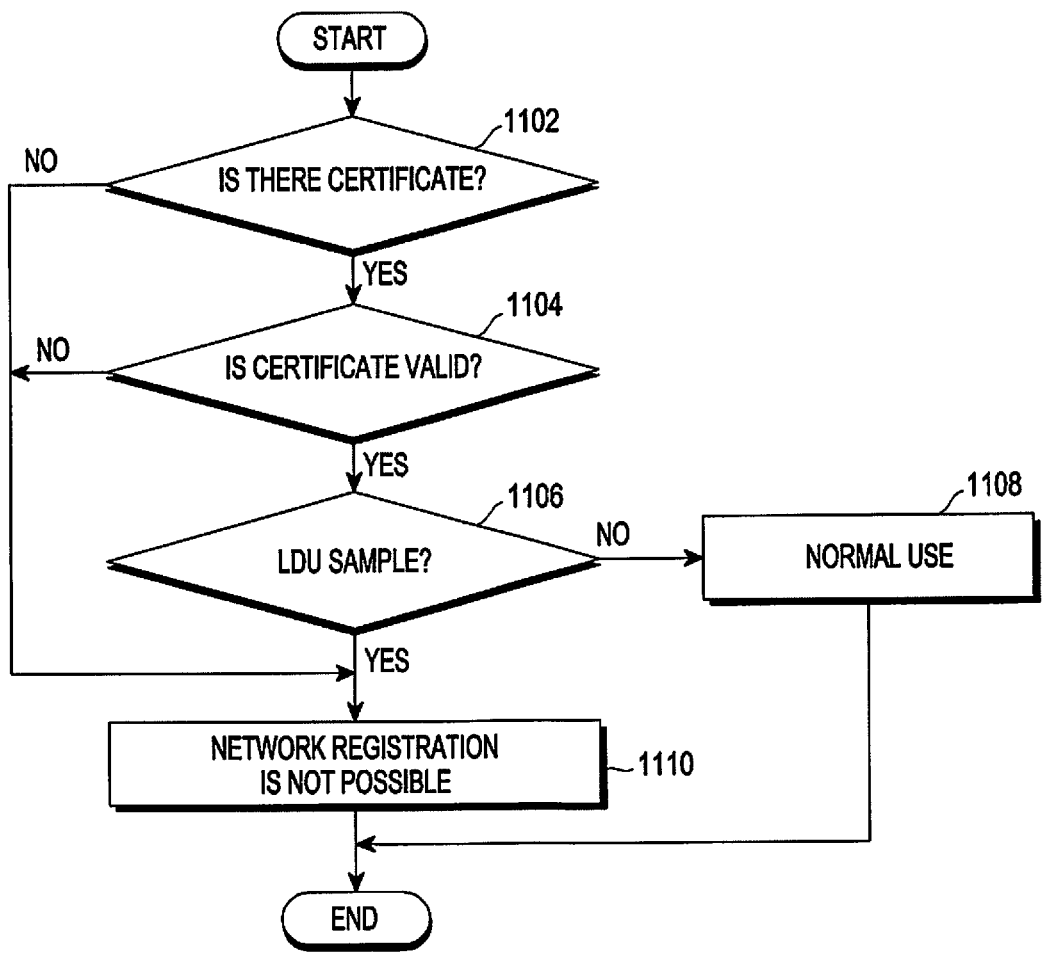
FIG. 11 is a flowchart illustrating a method of authenticating LDU information by an electronic device, according to an embodiment.

FIG. 11 is a flowchart illustrating a method of authenticating LDU information by an electronic device, according to an embodiment. Referring to FIG. 11, through the authentication method, LDU information of a terminal to be displayed may be identified or changed.

In operation 1102, it is determined whether there is a certificate received from the authentication server 252 in the electronic device 201. When there is no certificate based on the determination result, processing indicating that network registration is not possible is performed in operation 1110. When there is a certificate based on the determination result, it is determined whether the existing certificate is valid in operation 1104.

When the certificate is not valid based on the determination result, processing indicating that network registration is not possible is performed in operation 1110. When it is determined that the certificate is valid based on the determination result, in operation 1106, it is determined whether the electronic device 201 is configured as a current LDU sample by identifying LDU information stored at a predetermined location.

When the electronic device 201 is configured as the current LDU sample based on the determination result, processing indicating that network registration is not possible is performed in operation 1110. When the electronic device is not configured as the current LDU sample based on the determination result, the network function can be used and thus the electronic device 201 is normally used in operation 1108.

Figure 12:
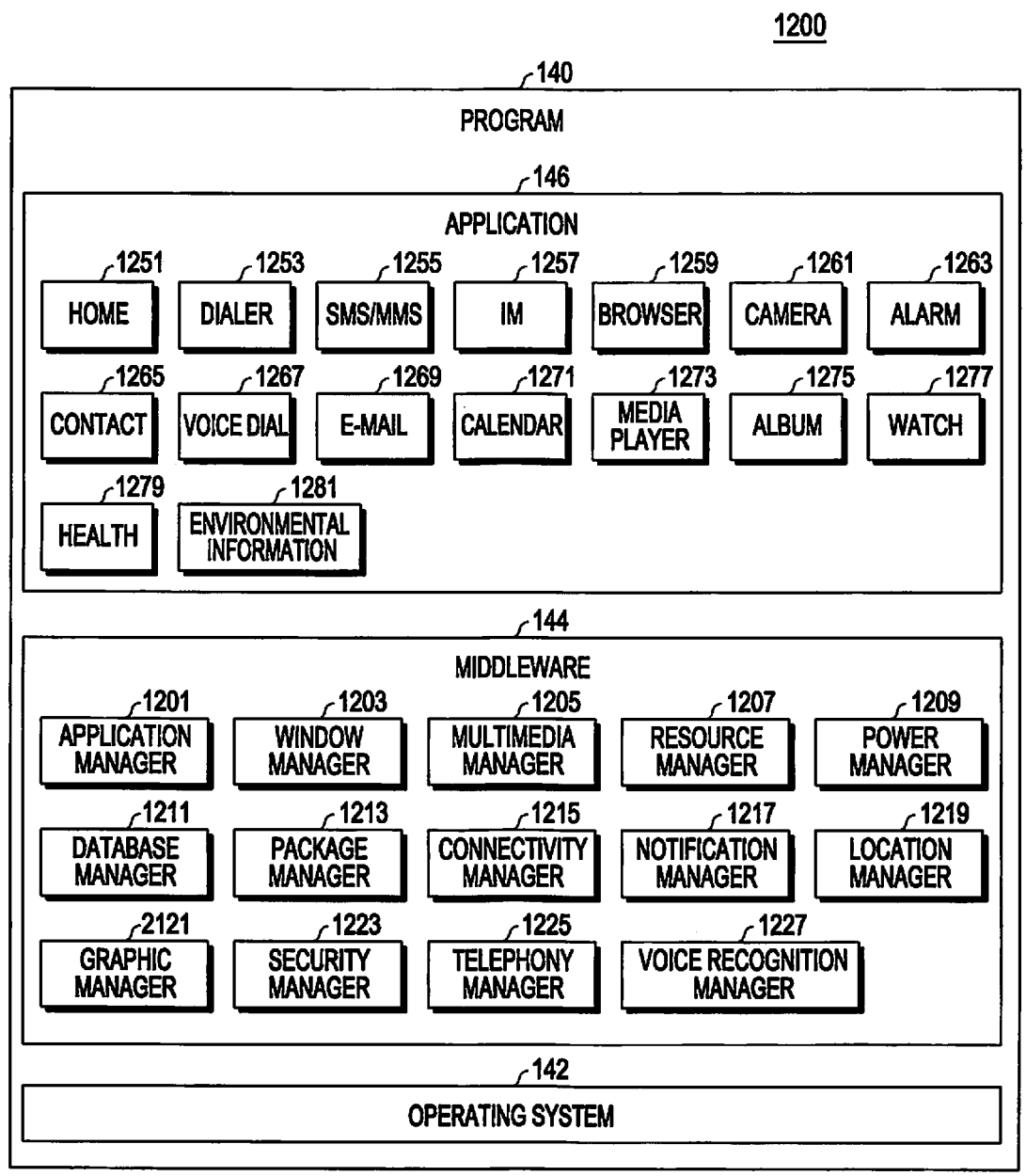
FIG. 12 is a block diagram illustrating a program, according to an embodiment.

FIG. 12 is a block diagram 1200 illustrating the program 140 according to various embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 1201, a window manager 1203, a multimedia manager 1205, a resource manager 1207, a power manager 1209, a database manager 1211, a package manager 1213, a connectivity manager 1215, a notification manager 1217, a location manager 1219, a graphic manager 1221, a security manager 1223, a telephony manager 1225, or a voice recognition manager 1227.

The application manager 1201, for example, may manage the life cycle of the application 146. The window manager 1203, for example, may manage one or more graphical user interface (GUI) resources that are used on a screen. The multimedia manager 1205, for example, may identify one or more formats to be used to play media files, and may encode or decode a corresponding one of the media files using a codec appropriate for a corresponding format selected from the one or more formats. The resource manager 1207, for example, may manage the source code of the application 146 or a memory space of the memory 130. The power manager 1209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 1209 may interwork with a basic input/output system (BIOS) (not shown) of the electronic device 101.

The database manager 1211, for example, may generate, search, or change a database to be used by the application 146. The package manager 1213, for example, may manage installation or update of an application that is distributed in the form of a package file. The connectivity manager 1215, for example, may manage a wireless connection or a direct connection between the electronic device 101 and the external electronic device. The notification manager 1217, for example, may provide a function to notify a user of an occurrence of a specified event (e.g., an incoming call, message, or alert). The location manager 1219, for example, may manage locational information on the electronic device 101. The graphic manager 1221, for example, may manage one or more graphic effects to be offered to a user or a user interface related to the one or more graphic effects.

The security manager 1223, for example, may provide system security or user authentication. The telephony manager 1225, for example, may manage a voice call function or a video call function provided by the electronic device 101. The voice recognition manager 1227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 1244 may dynamically delete some existing components or add new components. According to an embodiment, at least part of the middleware 144 may be included as part of the OS 142 or may be implemented as another software separate from the OS 142.

The application 146 may include, for example, a home 1251, dialer 1253, short message service (SMS)/multimedia messaging service (MMS) 1255, instant message (IM) 1257, browser 1259, camera 1261, alarm 1263, contact 1265, voice recognition 1267, email 1269, calendar 1271, media player 1273, album 1275, watch 1277, health 1279 (e.g., for measuring the degree of workout or biometric information, such as blood sugar), or environmental information 1281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 1269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device which communicates with the electronic device 10 or some component thereof (e.g., a display device 160 or a camera module 180). The device management application, additionally or alternatively, may support installation, delete, or update of an application running on the external electronic device.

Each of the constituent elements described in various embodiments of the disclosure may include one or more components, and the names of the corresponding elements may vary depending on the type of electronic device. In various embodiments, the electronic device may include at least one of the constituent elements disclosed herein. Some of the elements may be omitted from or other additional elements may be further included in the electronic device. Also, some of the constituent elements of the electronic device according to various embodiments may be combined into one entity, which may perform functions identical to those of the relevant elements before the combination.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. The "module" may be mechanically or electronically implemented. For example, the "module" may include at least one of an application-specific integrated circuit (ASIC) chip, field-programmable gate arrays (FPGAs), and a programmable logic device for performing known operations or operations to be developed in the future.

Devices (e.g., modules or functions thereof) and methods (e.g., operations) according to various embodiments may be implemented as instructions that are stored in the form of a program module in a computer-readable storage medium. The instructions, when executed by a processor (e.g., processor 120), may cause the processor to perform one or more functions corresponding to the instructions. The computer-readable storage medium may be, for example, a memory 130.

The computer-readable storage medium may include a hard disc, a floppy disc, a magnetic medium (e.g., magnetic tape), an optical medium (e.g., compact disc read only memory (CD-ROM), or a digital versatile disc (DVD)), a magneto-optical medium (e.g., a floptical disk), and a hardware device (e.g., read only memory (ROM), a random access memory (RAM), or a flash memory). The program instructions may include machine language codes generated by a compiler or computer-executable codes that can be executed using an interpreter. The hardware device may be configured to operate as one or more software modules for operations according to various embodiments, and vice versa.

According to various embodiments, a module or a program module may include one or more of the above-described elements, exclude some of them, or further include additional other elements. According to various embodiments, operations performed by the module, the program, or another element may be carried out sequentially, in parallel, repeatedly, or heuristically, or some of the operations may be executed in a different order or omitted, or one or more other operations may be added.

According to various embodiments, a storage medium for storing instructions may be provided. The instructions may be configured to cause at least one processor to, when executed by the at least one processor, perform at least one operation. The at least one operation may include an operation of identifying generation of an authentication event for communication-related security data, an operation of identifying at least one piece of communication-related security data stored in a predetermined area of the electronic device in accordance with the generation of the authentication event, an operation of transmitting at least one piece of the identified communication-related security data to an authentication server through a communication circuit, an operation of receiving a certificate generated based on the transmitted communication-related security data from the authentication server through the communication circuit, and an operation of authenticating use authority of the communication-related security data, based on the received certificate.

Further, the embodiments disclosed herein have been presented to easily explain the technical contents of the disclosure and help understanding of them, and are not intended to limit the scope of the disclosure. Therefore, the scope of the disclosure should be construed to include all changes, modifications, and various other embodiments based on the technical idea of the disclosure.

The invention claimed is:

1. An electronic device comprising:
a communication circuit; and
at least one processor operatively connected to the communication circuit,
wherein the at least one processor is configured to:
identify generation of an authentication event for communication-related security data,
in response to the generation of the authentication event, identify at least one piece of communication-related security data stored in a predetermined area of the electronic device,
transmit a certificate request message including the at least one piece of identified communication-related security data to an authentication server through the communication circuit,
receive a certificate generated based on at least the communication-related security data included in the transmitted certificate request message from the authentication server through the communication circuit, and
authenticate use authority of the communication-related security data, based on the received certificate.

2. The electronic device of claim 1, wherein the communication-related security data includes at least one of an international mobile equipment identity (IMEI), a mobile equipment identifier (MEID), a carrier identification (ID), a network lock or subscriber identity module (SIM) lock-related information, production area or region-related data, master subsidy lock (MSL) information, or local display unit (LDU) information.

3. The electronic device of claim 2, wherein the network lock-related information includes at least one of a network lock password, a network control key (NCK), a master control key (MCK), a network subset code key (NSCK), a service provider control key (SPCK), a SIM/universal SIM lock (SIMCK), a corporate lock key (CPCK) network lock or a SIM lock activation information, configuration information of each type of network lock or SIM lock, or an allowed mobile country code (MCC)/mobile network code (MNC) list or a black MCC/MNC list of an operator SIM.

4. The electronic device of claim 1, wherein the authentication event includes a request for information on the electronic device transmitted from the authentication server.

5. The electronic device of claim 1, wherein the authentication event includes an event for configuring a network lock or a subscriber identity module (SIM) lock of the electronic device or an event for configuring a network/SIM unlock.

6. The electronic device of claim 1, wherein the authentication event includes at least one of a request for recording, deleting, changing, or updating the communication-related security data.

7. The electronic device of claim 1, wherein the authentication event includes a request for changing a configuration of local display unit (LDU) information.

8. The electronic device of claim 1, wherein the at least one processor includes at least one of an application processor (AP) or a communication processor (CP).

9. The electronic device of claim 1, wherein the at least one processor is further configured to calculate an external hash value by decoding the certificate using a public key received together with the certificate, identify the communication-related security data stored in the electronic device, calculate an internal hash value, based on the communication-related security data, and determine whether authentication is performed by comparing the external hash value and the internal hash value.

10. The electronic device of claim 1, wherein the certificate is generated based on the communication-related security data and a unique value of the at least one processor.

11. A method of performing authentication by an electronic device, the method comprising:

identifying generation of an authentication event for communication-related security data;
in response to the generation of the authentication event, identifying at least one piece of communication-related security data stored in a predetermined area of the electronic device;
transmitting a certificate request message including the at least one piece of identified communication-related security data to an authentication server through a communication circuit;
receiving a certificate generated based on at least the communication-related security data included in the transmitted certificate request message from the authentication server through the communication circuit; and
authenticating use authority of the communication-related security data, based on the received certificate.

12. The method of claim 11, wherein the communication-related security data includes at least one of an international mobile equipment identity (IMEI), a mobile equipment identifier (MEID), a carrier identification (ID), a network lock or subscriber identity module (SIM) lock-related information, production area or region-related data, master subsidy lock (MSL) information, or local display unit (LDU) information.

13. The method of claim 12, wherein the network lock-related information includes at least one of a network lock password, a network control key (NCK), a master control key (MCK), a network subset code key (NSCK), a service provider control key (SPCK), a SIM/universal SIM lock (SIMCK), a corporate lock key (CPCK) network lock or a SIM lock activation information, configuration information of each type of network lock or SIM lock, or an allowed mobile country code (MCC)/mobile network code (MNC) list or a black MCC/MNC list of an operator SIM.

14. The method of claim 11, wherein the authentication event includes a request for information on the electronic device transmitted from the authentication server.

15. The method of claim 11, wherein the authentication event includes an event for configuring a network lock or a subscriber identity module (SIM) lock of the electronic device or an event for configuring a network/SIM unlock.

16. The method of claim 11, wherein the authentication event includes at least one of a request for recording, deleting, changing, or updating the communication-related security data.

17. The method of claim 11, wherein the authentication event includes a request for changing a configuration of local display unit (LDU) information.

18. The method of claim 11, further comprising:
calculating an external hash value by decoding the certificate using a public key received together with the certificate;
identifying the communication-related security data stored in the electronic device;
calculating an internal hash value, based on the communication-related security data; and
determining whether authentication is performed by comparing the external hash value and the internal hash value.

19. The method of claim 11, wherein the certificate is generated based on the communication-related security data and a unique value of the at least one processor.

20. An electronic device comprising:
a communication circuit;
a memory; and
at least one processor operatively connected to the communication circuit,
wherein the memory stores instructions configured to, when executed, cause the at least one processor to:
identify generation of an authentication event for communication-related security data,
in response to the generation of the authentication event, identify at least one piece of communication-related security data stored in a predetermined area of the electronic device,
transmit a certificate request message including the at least one piece of identified communication-related security data to an authentication server through the communication circuit,
receive a certificate generated based on at least the communication-related security data included in the transmitted certificate request message from the authentication server through the communication circuit, and
authenticate use authority of the communication-related security data, based on the received certificate.

* * * * *